United States Patent
Van Der Zwan et al.

(10) Patent No.: US 10,140,756 B2
(45) Date of Patent: Nov. 27, 2018

(54) METHOD FOR CREATING A SPATIAL MODEL WITH A HAND-HELD DISTANCE MEASURING DEVICE

(71) Applicant: LEICA GEOSYSTEMS AG, Heerbrugg (CH)

(72) Inventors: Elmar Vincent Van Der Zwan, Altstätten (CH); Bernhard Metzler, Dornbirn (AT); Thomas Ammer, Widnau (CH); Nicolas Boehrer, St. Gallen (CH); Michael Helmberger, Feldkirch (AT)

(73) Assignee: LEICA GEOSYSTEMS AG, Heerbrugg (CH)

( * ) Notice: Subject to any disclaimer, the term of this patent is extended or adjusted under 35 U.S.C. 154(b) by 38 days.

(21) Appl. No.: 15/378,956

(22) Filed: Dec. 14, 2016

(65) Prior Publication Data

US 2017/0169604 A1  Jun. 15, 2017

(30) Foreign Application Priority Data

Dec. 14, 2015 (EP) ..................................... 15199917

(51) Int. Cl.
*G06K 9/00* (2006.01)
*G06T 17/00* (2006.01)
(Continued)

(52) U.S. Cl.
CPC ............ *G06T 17/00* (2013.01); *G01S 7/4808* (2013.01); *G01S 17/023* (2013.01); *G01S 17/08* (2013.01);
(Continued)

(58) Field of Classification Search
CPC ...... G01S 17/08; G01S 17/023; G01S 7/4808; G06T 7/521; G06T 17/00; G06T 3/40;
(Continued)

(56) References Cited

U.S. PATENT DOCUMENTS

| 5,815,251 A | 9/1998 | Ehbets et al. |
| 5,949,531 A | 9/1999 | Ehbets et al. |

(Continued)

FOREIGN PATENT DOCUMENTS

| CN | 104268379 A | 1/2015 |
| CN | 104330022 A | 2/2015 |

(Continued)

OTHER PUBLICATIONS

Shim, H., et al., "Time-of-flight sensor and color camera calibration for multi-view acquisition", The Visual Computer, vol. 28, No. 12, Dec. 28, 2011, pp. 1139-1151.

(Continued)

*Primary Examiner* — Daniel G Mariam
(74) *Attorney, Agent, or Firm* — Maschoff Brennan (57) ABSTRACT

Method for creating a spatial model of a target object with a hand-held distance measuring device, the device comprising a laser distance meter, a camera, a computing unit and a data storage device, the method comprising measuring with the laser distance meter one or more distances to the target object from different positions, storing the measured distances in the data storage device, capturing with the camera a plurality of images of the target object, wherein each of the measured distances is associated with one of the captured images, determining with the computing unit relative camera poses for the plurality of images, and calculating with the computing unit based on the plurality of images and on the determined relative camera poses a three-dimensional geometry of the target object.

23 Claims, 6 Drawing Sheets

(51) Int. Cl.
*G06T 7/62* (2017.01)
*G06T 7/521* (2017.01)
*G06T 3/40* (2006.01)
*G01S 17/02* (2006.01)
*G01S 17/08* (2006.01)
*G01S 7/48* (2006.01)
*G06T 7/579* (2017.01)
*G06T 7/50* (2017.01)

(52) U.S. Cl.
CPC .............. *G06T 3/40* (2013.01); *G06T 7/50* (2017.01); *G06T 7/521* (2017.01); *G06T 7/579* (2017.01); *G06T 7/62* (2017.01); *G06T 2207/10016* (2013.01)

(58) Field of Classification Search
CPC ... G06T 7/62; G06T 2207/10016; G06T 7/50; G06T 7/579
USPC .......................................................... 382/154
See application file for complete search history.

(56) References Cited

U.S. PATENT DOCUMENTS

| | | | |
|---|---|---|---|
| 6,879,921 B2 | 4/2005 | Bögel et al. | |
| 7,742,176 B2 | 6/2010 | Braunecker et al. | |
| 9,470,792 B2 | 10/2016 | Giger | |
| 9,662,564 B1* | 5/2017 | Hensel | A63F 13/00 |
| 9,886,774 B2* | 2/2018 | Fathi | G06T 7/60 |
| 2003/0202089 A1* | 10/2003 | Alhadef | G01C 11/06 348/42 |
| 2010/0259594 A1 | 10/2010 | Johansson et al. | |
| 2015/0022640 A1 | 1/2015 | Metzler et al. | |
| 2015/0109407 A1 | 4/2015 | Giger | |
| 2015/0248772 A1* | 9/2015 | Gove | H04N 5/247 348/158 |
| 2016/0189362 A1 | 6/2016 | Evers-Senne et al. | |
| 2016/0260250 A1* | 9/2016 | Jovanovic | G06T 7/564 |
| 2016/0282107 A1* | 9/2016 | Roland | G01B 11/14 |

FOREIGN PATENT DOCUMENTS

| | | |
|---|---|---|
| CN | 104913763 A | 9/2015 |
| DE | 10 2013 009 288 A1 | 12/2014 |
| EP | 0 701 702 B1 | 2/1997 |
| EP | 0 738 899 B1 | 3/2000 |
| EP | 1 517 117 A1 | 3/2005 |
| EP | 2 669 707 A1 | 12/2013 |
| WO | 02/50564 A2 | 6/2002 |
| WO | 2014/112911 A1 | 7/2014 |
| WO | 2014/152254 A2 | 9/2014 |
| WO | 2015/066319 A1 | 5/2015 |

OTHER PUBLICATIONS

European Search Report dated Jun. 7, 2016 as received in Application No. 15199917.4.

* cited by examiner

METHOD FOR CREATING A SPATIAL MODEL WITH A HAND-HELD DISTANCE MEASURING DEVICE

FIELD

The present invention relates to a method and a handheld distance measuring device having a distance measuring unit and at least one camera for creating a spatial model of an environment. Distances between spatial points in the environment can be ascertained on the basis of the spatial model, without having to measure these distances directly.

BACKGROUND

Methods and systems for distance measurement are used in many applications. Examples thereof are extremely precise measurements in geodetic applications, but also measurement tasks in the field of construction installation or for industrial process controllers. For these tasks, stationary, movable, or also handheld distance measuring devices are used, which execute an optical distance measurement to a selected target point. For this purpose, a laser beam is usually emitted and received again and analyzed after reflection on the target. Various measurement principles are available for determining the distance in this case, for example, phase measurement or time-of-flight measurement.

In particular in the field of construction installation or construction removal, portable devices to be held in the hand are used, which are applied in relation to a structure to be surveyed and then carry out a distance measurement to a surface. One typical handheld distance measuring device, which is suitable for such applications, is described, for example, in EP 0 738 899 and EP 0 701 702.

Since a target spot which is visible on the surface to be measured is advantageous for most applications, red lasers are usually used as radiation sources for the distance measurement. Precisions down to the millimeter range are thus achievable with great handling comfort using distance meters of the prior art. Using currently available handheld distance measuring devices, measurements can be carried out from one point to another point, to which a visual connection exists. If the target is concealed, horizontal or vertical dimensions can also be ascertained by means of an inclination sensor.

Various solutions using handheld distance measuring devices having laser distance meters are described in the prior art, by means of which distances can be indirectly measured.

Methods in which the distance measuring device can be held freely in the hand are more comfortable for the user: A method for determining a current position of a distance measuring device is disclosed in EP 1 517 117 A1. In this case, a laser scanner of the distance measuring device scans a spatial segment and detects a plurality of previously attached punctiform referencing means therein, on the basis of which a current position of the distance measuring device can be ascertained. On the other hand, the necessity of preparing the measuring environment in a time-consuming manner by distributing the detectable referencing means therein for the measuring method is disadvantageous.

EP 2 669 707 A1 discloses a further method for indirect determination of distances using a handheld distance measuring device, wherein the distances are ascertained by means of a panoramic image recorded by a camera of the distance measuring device. To execute this method, simultaneously to a measurement of the distance to two spatial points, by an image acquisition unit images are recorded of the environment of the spatial points, which are joined together to form a single panoramic image by means of image stitching, for example, so that a number of pixels between the two spatial points can be ascertained from the images linked to one another. An angle can be ascertained from this number of pixels. The desired distance between the two spatial points can be calculated using the law of cosines. A handheld distance measuring device according to EP 2 669 707 A1 contains for this purpose an image acquisition unit having at least one camera and an image analysis unit for joining together the images and for ascertaining the pixel number. However, this method is essentially only applicable to distances between points on the same plane, for example, on the same wall.

SUMMARY

Some embodiments of the present invention provide an improved method for creating a spatial model of a target object.

Some embodiments provide such a method which allows creating the spatial model with a mobile distance measuring device. In particular, it is an object of the invention to provide such a method, in which the distance measuring device can be held freely movably in the hand by a user during the entire procedure.

Some embodiments provide such a method which requires no post-processing steps and allows a user to see the result on-site.

Some embodiments of the invention provide such a method, which is applicable without preparations of the measuring environment—in particular without attaching referencing means which can be acquired—and is therefore executable more rapidly.

Some embodiments of the present invention provide a handheld distance measuring device for executing such a method.

Some embodiments include a method for creating a spatial model of a target object with a hand-held distance measuring device, the device comprising a laser distance meter, a camera, a computing unit and a data storage device, according to the invention comprises
- measuring with the laser distance meter one or more distances to the target object,
- storing the one or more distances in the data storage device,
- capturing with the camera a plurality of images of the target object from different positions, wherein each of the one or more distances is associated with one of the captured images,
- determining with the computing unit relative camera poses for the plurality of images, and
- calculating with the computing unit based on the plurality of images and on the determined relative camera poses a three-dimensional geometry of the target object, After the three-dimensional geometry has been calculated, the method according to the invention further comprises
- retrieving at least one of the measured distances from the data storage device, and
- adding a scale to the three-dimensional geometry to obtain the spatial model of the target object, wherein the scale is calculated based on the at least one retrieved distance.

In one embodiment of the method, calculating the three-dimensional geometry is performed by means of a Structure-from-Motion (SfM) algorithm or a Simultaneous Localization and Mapping (SLAM) algorithm of the computing unit.

In another embodiment of the method, the spatial model comprises image data of the images and a multitude of spatial coordinates, in particular a three-dimensional point cloud or surface model, obtained by means of feature extraction in the images and three-dimensional geometry obtained therefrom.

According to yet another embodiment, the three-dimensional geometry is calculated without a scale, or with a preliminary scale. In case of a preliminary scale, the step of adding the (final) scale comprises replacing the preliminary scale with the scale that is based on the at least one retrieved distance.

In a further embodiment of the method, calculating the scale comprises identifying a measurement point to which a distance is measured by the laser distance meter in one or more images that are not associated with the respective distance, and determining three-dimensional coordinates of the measurement point by means of forward intersection.

According to one embodiment, a first distance of the one or more measured distances to the target object is measured simultaneously or basically simultaneously with the capturing of a first image of the plurality of images, wherein the first distance is associated with the first image, particularly wherein every distance of the one or more distances to the target object is measured simultaneously or basically simultaneously with the capturing of an image of the plurality of images.

According to another embodiment, the method according to the invention comprises capturing with the camera a plurality of images of a planar or substantially planar surface of the target object from a plurality of different positions, and measuring with the laser distance meter one or more distances to the planar surface, wherein each of the measured distances to the planar surface is associated with a captured image of the planar surface. In particular, a user of the device can be guided by the device to perform the manual steps.

In one embodiment, for calculating the scale, the point of the three-dimensional geometry (e.g. a dense or sparse point cloud) having the smallest orthogonal distance to the laser distance measurement emission direction is identified, particularly wherein a laser spot generated by the laser distance meter in the course of the at least one distance measurement is identified in an image.

In another embodiment, for calculating the scale, the laser distance measurement emission direction is intersected with a plane described by at least three points of the three-dimensional geometry, or with an object surface model, particularly obtained by meshing of a sparse or dense point cloud.

In another embodiment, for calculating the scale a dense matching algorithm, particularly a Semi-Global Matching (SGM) algorithm, is used to obtain the pixel location of the laser distance measurement in at least one image not associated with the laser distance measurement.

In another embodiment, a rough estimate of the scale is obtained using said intersection of the emission direction with the object surface model, and the rough estimate of the scale is refined using said dense matching algorithm.

According to a further embodiment, capturing the plurality of images comprises capturing at least three images, capturing up to 50 images, and/or recording an image stream, particularly a video stream.

Some embodiments include a hand-held distance measuring device for creating a spatial model of a target object comprises a laser distance meter, a camera, a computing unit and a data storage device. The laser distance meter is adapted to measure distances to the target object into a direction defined by an emission axis, the camera is adapted to capture images of the target object, wherein each measured distance is associated with a captured image, the data storage device is adapted to store the measured distances, and the computing unit is adapted to determine relative poses of the images and to calculate, based on the images and on the determined relative poses, a three-dimensional geometry of the target object. According to the invention, the computing unit is adapted, after having calculated the three-dimensional geometry, to retrieve at least one of the measured distances from the data storage device, and to add a scale to the three-dimensional geometry to obtain the spatial model of the target object, wherein the scale is based on the at least one retrieved distance.

According to one embodiment the camera is a wide-angle camera having a camera angle of at least 80° in particular of at least 100°.

According to another embodiment, the hand-held distance measuring device comprises a plurality of cameras, in particular at least three cameras, wherein the images are wide-angle images assembled from individual images of the plurality of cameras, and the angle range acquired by each of the images comprises at least 80°, in particular at least 120°, at least 150° or at least 180°. In a particular embodiment, the cameras are arranged in a line that is orthogonal to the emission axis. In another particular embodiment the cameras are arranged in the form of a hemisphere.

In yet another embodiment, the hand-held distance measuring device comprises a plurality of laser distance meters for simultaneously measuring a plurality of distances to different points of the target object.

In a further embodiment, the device comprises an inertial and/or location sensor, in particular comprising an inertial measuring unit, a gyroscope, an inclination sensor, a GNSS sensor, and/or a compass, for providing inertial and/or location data of the distance measuring device, wherein the computing unit is adapted to determine the relative poses based also on the inertial and/or location data. Alternatively, the computing unit is adapted to position the relative poses according to the location data in a post-processing step.

According to a further embodiment, the hand-held distance measuring device comprises a display device for displaying the spatial model and/or instructions to position the device in a certain pose to a user, in particular wherein the display device is embodied as a touchscreen.

Some embodiments of the invention relate to a computer program product having program code which is stored on a machine-readable carrier, in particular on a data storage device of the distance measuring device according to the invention, for executing at least one the following steps of the method according to the invention:
  measuring with the laser distance meter one or more distances to the target object,
  storing the one or more measured distances in the data storage device,
  capturing with the camera a plurality of images of the target object from different positions, wherein each of the measured distances is associated with one of the captured images,
  determining relative camera poses for the plurality of images, and calculating based on the plurality of images and on the determined relative camera poses a three-dimensional geometry of the target object, retrieving at least one of the measured distances from the data storage device, and adding a scale to the three-dimensional geometry, wherein the scale is based on the at least one retrieved distance.

BRIEF DESCRIPTION OF THE FIGURES

The handheld distance measuring device according to the invention and the method according to the invention are described in greater detail hereafter solely as examples on the basis of specific example embodiments, which are schematically illustrated in the drawings, wherein further advantages of the invention will also be discussed. In the specific figures.

DETAILED DESCRIPTION

Figure 1:
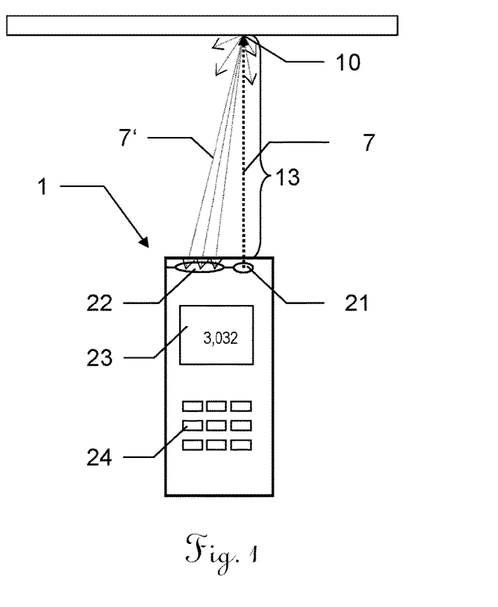
FIG. 1 shows a handheld distance measuring device having a laser distance meter.

FIG. 1 shows a handheld distance measuring device 1 for measuring distances. It has a housing, in which the required electronic components are arranged. The housing is implemented in this case so that the distance measuring device 1 can be held in the hand and can also be applied or fitted in a defined manner to a point to be measured. For this purpose, corresponding application edges or fitting elements which can be folded out or plugged on can be attached to the housing, as they are described, for example, in WO 02/50564. The distance measuring device 1 contains, on its front side, a laser distance meter (LDM) comprising a laser emission unit 21 and a laser receiving unit 22, which have optical openings in the housing. A display device 23 in the form of a screen and input means 24 in the form of a keypad are located on the upper side of the device 1. In addition, a viewfinder camera (not shown here) having a zoom functionality can be provided for recording images in the direction of the emission direction, which can be displayed on the display device 23.

According to the invention, the laser emission unit 21 emits a laser beam 7 toward a target point 10 on a wall. This wall has a naturally rough surface, from which optical beams are reflected in a scattered manner. A part of the scattered reflected beams 7' of the laser beam 7 is collected by the laser receiving unit 22, detected, and converted into an electrical signal. The signal is analyzed by an electronic circuit in a manner known per se to determine the digital value of the distance 13. For example, phase measurement or time-of-flight measurement can be used for the distance ascertainment. In this case, the extension between the laser receiving unit 22 and a measurement fitting is also taken into consideration. The value of the measured distance 13 which is digitally determined by the analysis is then provided to a user by the display device 23.

Figure 2:
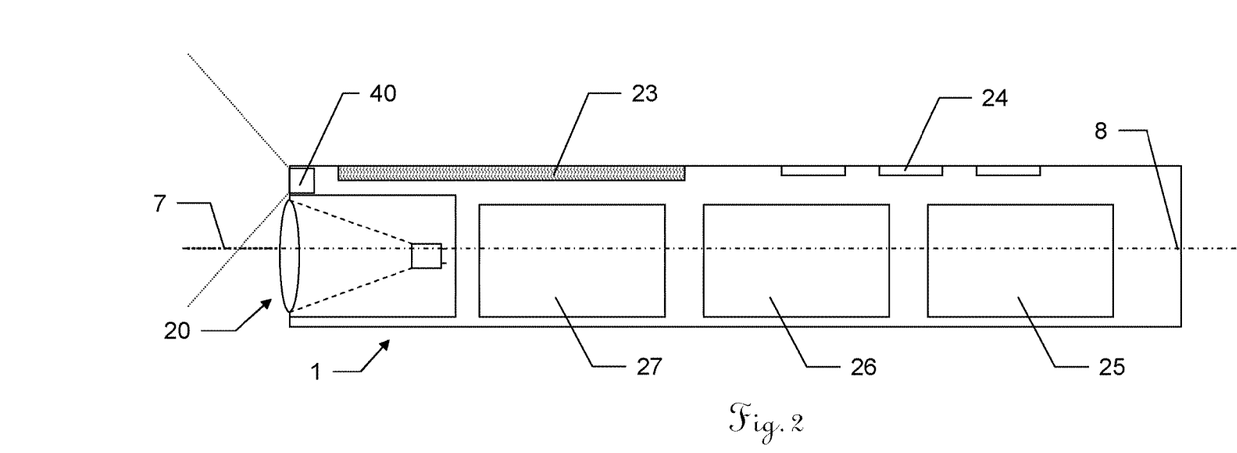
FIG. 2 shows an example embodiment of a handheld distance measuring device according to the invention in a longitudinal sectional view.

FIG. 2 shows a longitudinal section through an example embodiment of a handheld distance measuring device 1 according to the invention. The distance measuring device 1 comprises a laser distance meter 20 for measuring distances by means of a laser beam 7 emitted in a direction defined by an emission axis 8. Furthermore, a display screen 23 and input means 24 are shown.

The handheld distance measuring device 1 additionally has an image acquisition unit having at least one camera 40 for acquiring images of the environment.

A computing unit 25, a data storage device 26 and an inclination and acceleration sensor 27 are shown as internal components. The computing unit 25 contains program code for executing a functionality for preparing a spatial model on the basis of measured distances and acquired images of the environment. The data storage device 26 e.g. can comprise a random access memory (RAM), a hard disk drive (HDD) and/or a flash drive. In addition, an energy source (not shown here) is contained in the distance measuring device 1, in particular a battery or an accumulator cell, which provides electrical energy for the electrically operated components of the distance measuring device 1.

A digitally provided distance value—as is currently typical in the case of optically measured distances—can be stored by the data storage device 26 and further processed or transmitted by the computing unit 25 of the device and displayed on the display screen 23 to a user.

Figure 3A:
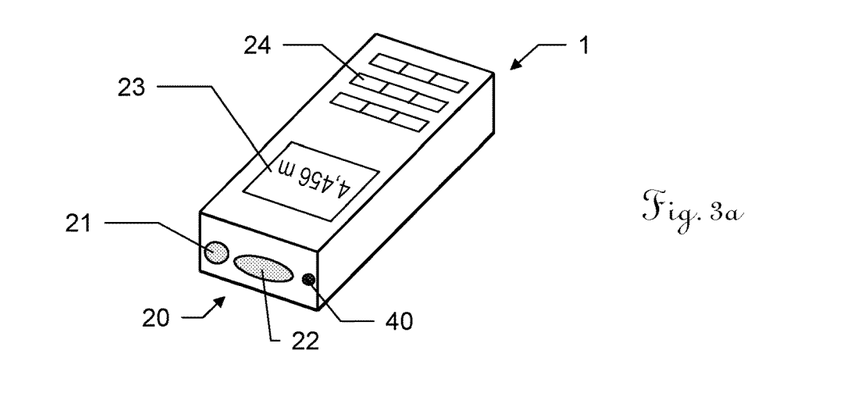
FIGS. 3a-c show three example embodiments of a handheld distance measuring device according to the invention having various camera arrangements.
Figure 3B:
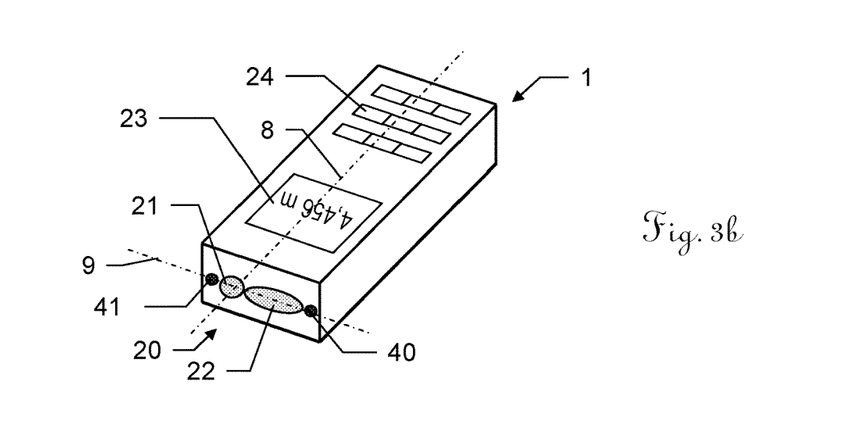
Figure 3C:
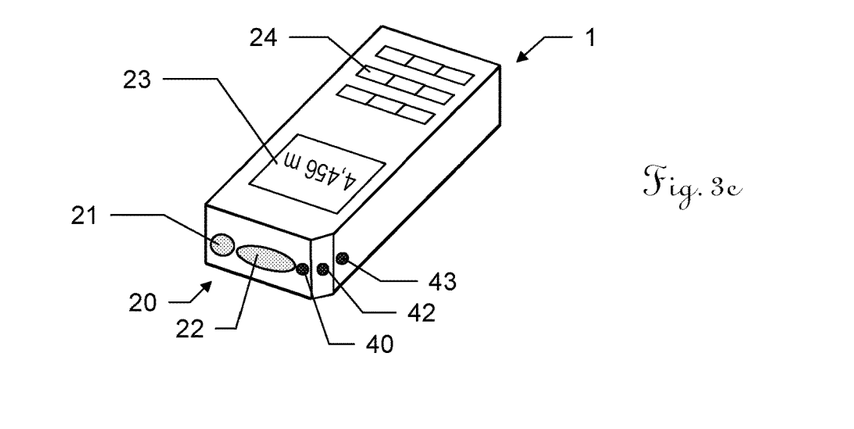

FIGS. 3a to 3c show three example embodiments of a handheld distance measuring device 1 according to the invention having three example embodiments of the image acquisition unit. The cameras 40-43 in the image acquisition units shown in FIGS. 3a to 3c are embodied in particular such that they make it possible to create a wide-angle image by simultaneously recording an image.

FIG. 3a shows a handheld distance measuring device 1 having a single camera 40, which is arranged adjacent to the laser emission unit 21 and the laser receiving unit 22 of the laser distance meter 20. Preferably, it is adapted as a wide-angle camera having a camera angle of at least 80°.

FIG. 3b shows a handheld distance measuring device 1 having a first camera 40, which is arranged on one side of the laser emission unit 21 and the laser receiving unit 22, and a second camera 41, which is arranged on the other side. The two cameras 40, 41 are arranged in a line 9 that is orthogonal to the emission axis 8. Optionally, three or more cameras can be arranged on the line 9. Images captured by these cameras are wide-angle images assembled from individual images of the two or more cameras 40, 41 arranged on the line 9. The angle range acquired by each of the combined images comprises at least 80°, in particular at least 120°, at least 150° or at least 180°.

FIG. 3c shows a handheld distance measuring device 1 having three cameras 40, 42, 43, which are arranged on the same side of the laser distance meter. Diverse further camera arrangements, are implementable, in particular multiple cameras can be arranged in each case on both sides of the laser distance meter 20, or (additionally or alternatively) cameras can be arranged above and/or below the laser distance meter 20.

FIGS. 4*a* to 4*c* and 5*a* to 5*c* show two further example embodiments of a handheld distance measuring device 1 according to the invention, each having a further example form of an image acquisition unit 45, 46 according to the invention.

Figure 4A:
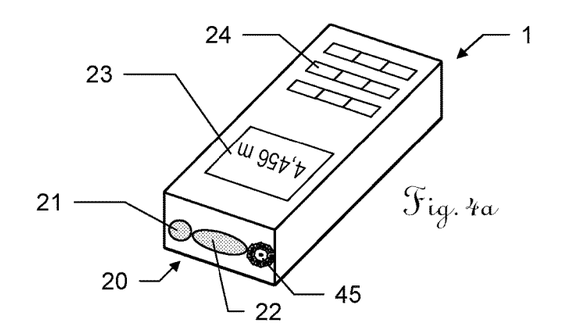
FIGS. 4a-c show a fourth example embodiment of a handheld distance measuring device according to the invention having a further example camera arrangement.
Figure 4B:
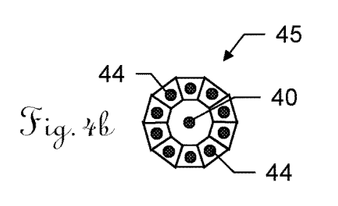
Figure 4C:
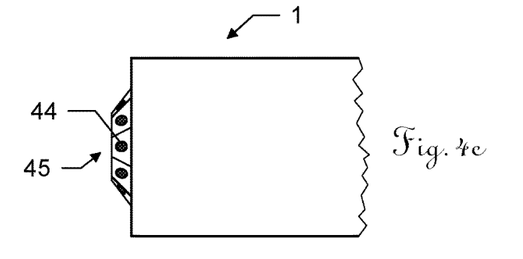

The image acquisition unit 45 shown in FIGS. 4*a* to 4*c* has a first camera 40, which is aligned along the emission direction of the laser distance meter 20, for recording images of the measurement region. In addition, the image acquisition unit 45 has a plurality of further cameras 44—ten cameras 44 in the example shown—which are arranged in a circle around the first camera 40 and are aligned in different target directions. It is thus possible to assemble a wide-angle image from the individual images.

Figure 5A:
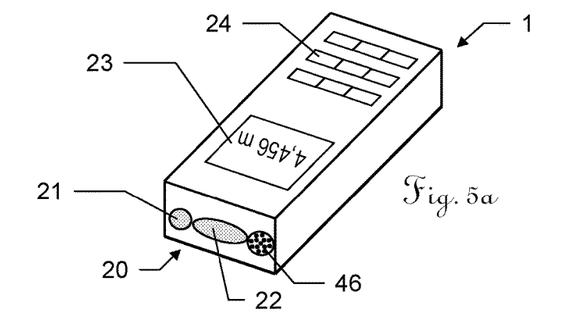
FIGS. 5a-c show a fifth example embodiment of a handheld distance measuring device according to the invention having a further example camera arrangement.
Figure 5B:
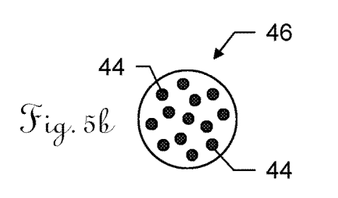
Figure 5C:
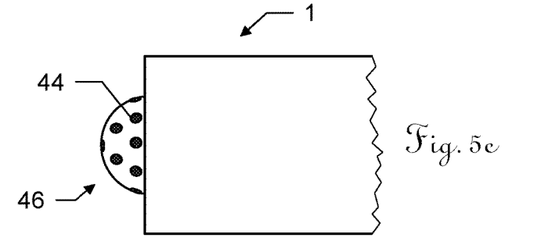

The image acquisition unit 46 shown in FIGS. 5*a* to 5*c* is embodied in the form of a hemisphere, on the surface of which a plurality of cameras 44 are arranged, for example, 18 cameras. It is also possible using this embodiment to assemble a wide-angle image from a plurality of simultaneously recorded individual images, wherein the recording angle can be up to 180° or even larger.

Embodiments having two hemispheres are also possible, which are attached laterally to the distance measuring device 1, for example, one hemisphere above and one below the device.

The cameras 40-44 of all above-described embodiments can advantageously be embodied as wafer-level cameras (WLC). WLCs have an image sensor, for example, a CMOS image sensor, lenses, and spacers, which are produced in the wafer level, stacked, and joined together to form a single part. The camera is then housed as an integrated overall system on the surface of a semiconductor plate. WLCs are particularly mechanically stable and are only to be calibrated once during the manufacturing.

In particular, cameras having so-called backside illumination can also be used, for example, based on the OmniBSI-2™ from OmniVision®.

Cameras 40-44 of all above-described embodiments can also advantageously be embodied for recording high-contrast images (or high dynamic range images (HDRI)). In particular, for this purpose the cameras have digital image sensors having high dynamic range and are equipped, for example, with the chip OV10626 from OmniVision® or comparable products. This technology, which is heretofore known, for example, from camera systems for use as assistance systems in motor vehicles, enables the simultaneous acquisition of multiple illumination stages and is therefore suitable for simultaneously imaging both sunlit regions and also regions lying in shadow with high contrast, i.e., avoiding overexposure and underexposure. The feature identification and feature extraction can advantageously thus be optimized in the entire image region, even in the event of difficult light conditions.

Alternatively, the cameras 40-44 can also be embodied for rapidly recording exposure series, or the image acquisition unit has at least one camera for recording images of bright regions and at least one camera for recording images of dark regions.

Figure 6A:
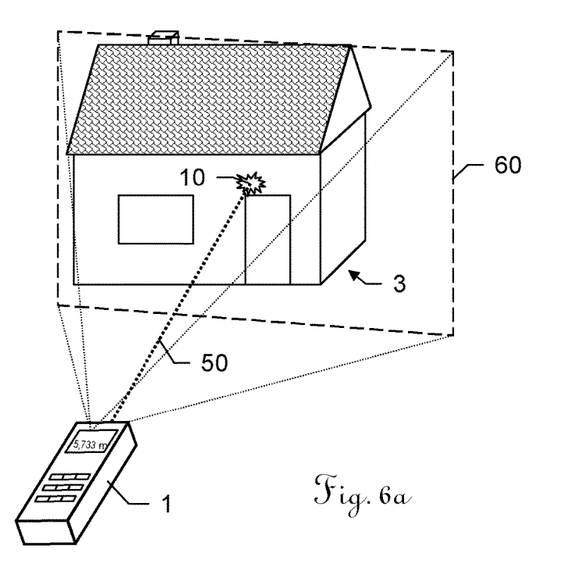
FIGS. 6a-b show the measurement of distances to a target object and the simultaneous capturing of images of the target object.
Figure 6B:
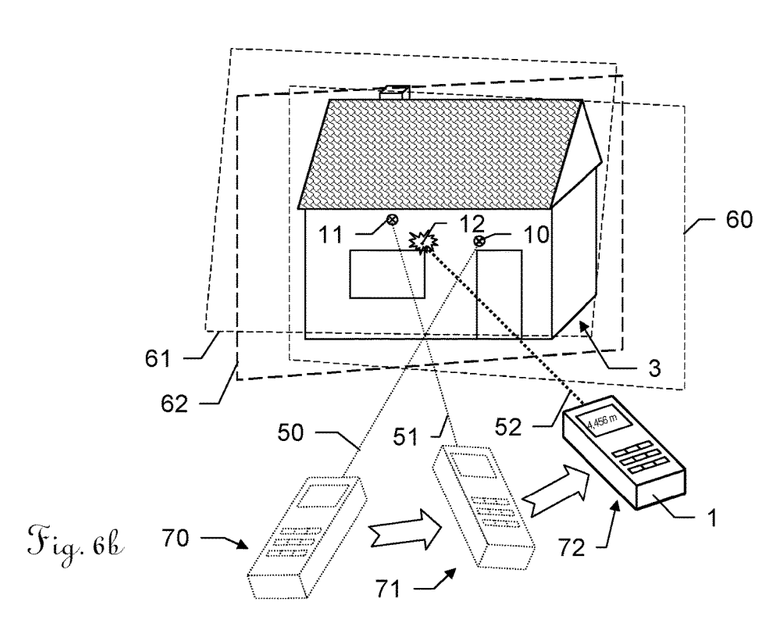

FIGS. 6*a* and 6*b* illustrate the simultaneous measuring of distances 50, 51, 52 to a target object (house 3) and capturing images 60, 61, 62 of the target object 3. FIG. 6*a* shows a first measurement, and FIG. 6*b* shows consecutive measurements.

The depicted hand-held distance-measurement device 1 has a laser distance meter (LDM) and a wide-angle camera that can be used to perform photogrammetric measurements. An image 60, 61, from the wide-angle camera is associated with each distance-measurement 50, 51, 52. Optionally, multiple laser distance meters can be used to enhance the solution, making it more robust and accurate.

The association of the image and the distance-measurement can be achieved by simultaneously taking the image and measuring the distance. Optionally, the device may comprise a clock or another device defining a common time frame to which each observation can be related.

Computer vision algorithms are used to determine the relative poses 70, 71, 72 of the device 1 during each of the measurements 50, 51, 52. The LDM measurements 50, 51, 52 are used to provide scaling to a scale-free computer vision solution. A three-dimensional (3D) position relative to the poses 70, 71, 72 can be found for each selected point in an image, which can be identified in at least a second image—either by manual or automatic matching.

The user can use the device 1 to measure distances on an object of interest or measure inclinations with the aid of a built-in inertial measurement unit (IMU). An IMU is an electronic device that measures physical forces acting upon it. It is typically sensitive to linear accelerations through accelerometers and angular velocities through gyroscopes. Optionally, a compass is also included. Easy field measurements that can be used as control measurements are performed on the device directly after the recording, more complicated analysis can be performed using suitable office software.

As illustrated in FIG. 6*b*, a user takes a plurality of images, e.g. between two and 20 images, in this example three images 60, 61, 62, of a single target object 3. Optionally, the user may record an image stream (e.g. video stream) instead of separate images. While the images 60, 61, 62 are recorded, the processing starts on the device 1. Optionally, the user can be actively guided by the device 1 to add additional positions in order to improve accuracy. As soon as the last image 62 is recorded, final processing starts on the device 1, so that a short time later the—unscaled—3D geometry (not to be confused with the scaled 3D model) of the scene and the target object 3 therein is available on the device 1. This means that at this time the relative orientations and relative scale, i.e. the relative poses 70, 71, 72, of the images 60, 61, 62 are known. This is the output of a Structure-from-Motion (SfM) or Simultaneous Localization and Mapping (SLAM) algorithm.

The user can now use the calculated 3D geometry to photogrammetrically measure individual points from the images. The user can also perform simple combined measurements such as linear distances or slope determinations using an additional accelerometer. Accuracy can be indicated for every measurement that the user makes. The user measurements are denoted in physical units after the three-dimensional geometry has been scaled using one or more laser distance measurements.

Optionally, by adding a "G-vector", i.e. information from an accelerometer or inclinometer of the device, the generated model can be oriented with respect to horizon. By adding positional information, e.g. from an internal receiver of the device or via a connected Smartphone or tablet PC, the model and/or its heading angle optionally can be geo-referenced (geo-tag).

Optionally, the user can add additional captures of the same scene at any point later to further enhance the model.

In the office, on a desktop PC, the user can perform further or more complicated measurements in the images. Optionally, an object model is calculated on the desktop PC which the user can use for 3D visualization or performing additional measurements. Either a dense point cloud (the output of a dense matching algorithm) or a textured, meshed or simplified model can be made available.

Before the LDM measurements 50, 51, 52 can be used to derive the scale of an image-based reconstruction, for optimum performance the LDM module needs to be calibrated with respect to the camera, i.e. the position and orientation of the LDM module in the camera coordinate system needs to be determined. LDM to camera calibrations are generally known from the art. E.g., such a calibration can comprise a camera calibration first. Afterwards, in a moderately lit room close-range images are taken of a flat wall with the laser spot visible thereon in the image. For the same device position also a LDM measurement is recorded. The laser spot positions are found in the images and a non-linear system of equations is solved to obtain the LDM calibration. Optionally, photogrammetric markers at known positions on the wall recorded in the image can be used to photogrammetrically verify the calibration.

If the LDM laser and the camera are calibrated, it is easy to identify the location of the laser spot 10, 11, 12 in an image 60, 61, 62 that was recorded at the same time—even if the laser spot 10, 11, 12 itself is not visible (e.g. due to bright outdoor conditions). The location of the laser spot 10, 11, 12 in the current image 60, 61, 62 can be indicated to the user using some sort of image marker, e.g. cross hairs. The challenge lies in identifying the object point where a first laser spot 10 hit in one or more of the other images 61, 62 or equivalently in the 3D model. Typically, this is not an easy task if the laser spot 10 did not hit a significant image feature, i.e. a feature that can be easily found in one of the other images by itself. Three example approaches to perform this task according to the invention are described further below.

If the chosen approach leads to the laser spot 10 being identified in one or more of the other images 61, 62 instead of in the 3D model, forward intersection is used to find the 3D coordinates of the laser spot. Then the 3D reconstruction generated by Structure-from-Motion is scaled such that the distance from the LDM module to the 3D coordinates of the laser spot 10 corresponds to the distance 50 measured by the LDM. To increase the robustness and accuracy it makes sense to repeat the above procedure for different LDM measurements and potentially other images. If this is computationally feasible (also depends on the above variant chosen), the procedure is repeated for different parameters and the results are combined to a single scaling factor.

The first approach comprises "local semi-global matching" (SGM). The user is asked to keep a planar or basically planar (flat) surface area in the center of the first image. While recording the first image a distance to this planar surface is measured using the LDM. To find the laser spot 10 of the first image 60 in the second image 61, first the relevant part of the second image 61 is selected. Here the fact is used that the laser spot 10 of the first image 60 must be on the same epipolar line in the second image 61. Also some bounds can be put on the distance between the two camera positions 70, 71 (e.g. between one metre and 25 meters) to limit the search space along the epipolar line, as we already know the distance to the laser spot in the first image from the LDM.

Then the relevant parts of the images 60, 61 are selected and rectified. The relevant part of the epipolar line and several (e.g. up to 1000) image rows below and above it are selected to aid in the matching. Rectification means the epipolar lines are now horizontal and the laser spot 10 from the first image 60 must lie in the same row of the second image 61. Next, SGM or a similar algorithm is used to find the exact location of the first image's laser spot 10 in the second image 61. It is important that a (semi-)global matching algorithm is used, so surrounding significant features are used to find a matched position for the laser spot 10 of the first image 60 in the second image 61. The reconstruction is then scaled such that the laser spot distance from the first image 60 matches the distance 50 of the LDM measurement.

To improve the robustness of the matching, the user can be asked to take a second image 61 and distance measurement 51 after moving forward towards the object 3. Because the image contents between the two images 60, 61 are thus more similar than for normal sideways movement with respect to the object 3, the dense matching between the two images 60, 61 usually works better. This allows improving the robustness of the scale estimation.

The location of the laser spot 10, 11, 12 in other images 60, 61, 62 and thereby the robustness and accuracy of the scale estimation can optionally be improved by adding more images of the target area where the spot 10, 11, 12 is located. At the price of increased user effort and computational time this makes the dense reconstruction of the target object 3 more robust and more accurate. Optionally, the additional images can be recorded simultaneously by an additional Viewfinder camera having an increased magnification compared to the photogrammetric camera.

The second approach comprises a "Structure-from-Motion triangulation". The user is asked to keep an—at least approximately—planar surface area in the centre of each image 60, 61, 62. During the recording of each image 60, 61, 62, also a distance 50, 51, 52 is measured by means of the LDM. After the Structure-from-Motion (SfM) algorithm is finished, a ray from each reconstructed LDM position 70, 71, 72 is intersected with the SfM point cloud. This is done by intersecting the LDM ray with a plane described by at least three SfM points close to the LDM ray. Here it is assumed that the laser spot 10, 11, 12 on the object 3 lies in this plane. Now the SfM reconstruction can be scaled such that the distance to the object matches the LDM measured distance 50, 51, 52.

Although a single measurement of the scale using the above procedure is less reliable than with the first approach—the assumption that the laser spot lies in the plane formed by the three SfM points selected to build the plane is often not fulfilled 10, 11, 12—it is computationally quite cheap to perform the scaling using this method. Therefore in the second scaling approach advantageously a video of the object is recorded. This means that a multitude of images and LDM measurements are available. Outliers can thus be filtered out and an average can be computed by means of statistics.

Instead of interpolating the feature points in 3D to obtain the 3D coordinates of the laser spot, alternatively the laser spot 10, 11, 12 can be first found in the other image(s) from the geometric relationships between the 2D features (e.g. using a nomography). Then the 3D coordinates of the laser spot are computed using forward intersection of the obtained corresponding 2D image coordinates in at least two images in total.

The procedure can be repeated for different choices of surrounding SfM points. This creates multiple scaling factors for each LDM measurement. A statistical method can be used to retrieve a single scaling factor in a robust way.

Alternatively, a (semi-)dense 3D reconstruction algorithm is used on the device 1 to compute the scale-free geometry. The 3D coordinates of each LDM target position can be chosen as the reconstructed point closest to the intersection of the LDM with the geometry. Optionally, the 3D coordinates of the laser spot 10, 11, 12 on the object 3 can be refined using the meshing approach described above, where instead of SfM sparse points already (semi-)dense points are used.

A third approach combines the first and second approaches. First, a rough scale estimate is obtained using the SfM triangulation method. Then the result is used to run a reduced version of the local SGM method to refine the scale estimate. The SGM problem can be reduced in terms of the image areas considered and/or in terms of the depth range considered. Both provide a significant speedup of the SGM calculation.

A fourth approach comprises obtaining an initial or final estimate for the scale by selecting from a sparse or dense object point cloud the point that has the smallest orthogonal distance to the LDM emission ray ("nearest neighbour"). Said point is identified through the respective laser spot on the object in the associated image, and the location of the laser spot in at least one other image is obtained from the image observations of said object point.

By placing an object of known size and adequate geometry in the field of view of the camera, the method of scaling the SfM-geometry can be used in reverse to verify the calibration of the scaling.

The scale estimate retrieved from two or more images can optionally be verified in other images by analysis of the image patches at the predicted locations.

Figure 7:
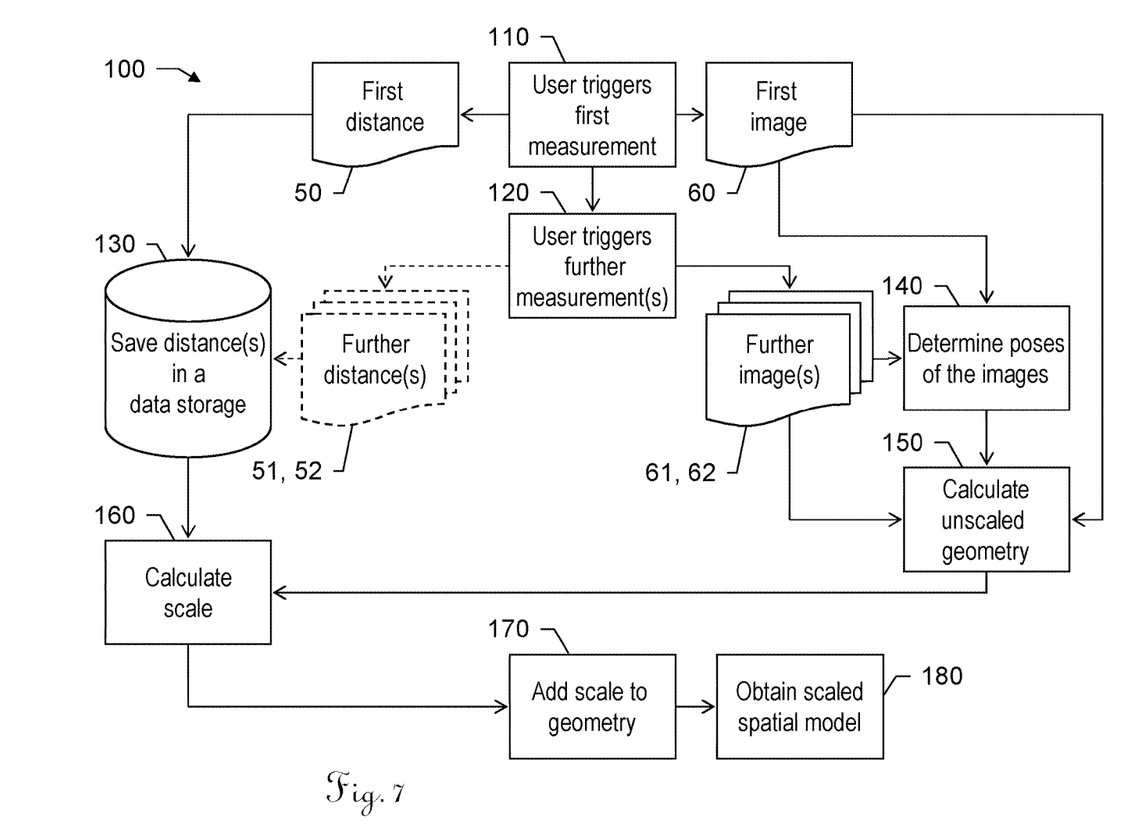
FIG. 7 shows a flow chart of an example embodiment of the method according to the invention.

FIG. 7 shows a flow chart for illustrating an example embodiment of a method 100 according to the invention. According to the depicted embodiment, the method 100 starts with the user pointing the device toward the target object and triggering the first measurement 110, which is then performed by the device which simultaneously measures a first distance 50 to the target object and captures a first image 60 of the target object. While the first distance 50 is saved in a data storage for later retrieval (step 130), the method 100 continues with the user triggering a second measurement (and subsequently further measurements) 120. Further distance(s) 51, 52 are measured and saved in the data storage, and further image(s) 61, 62 are captured simultaneously with each distance measurement. Alternatively, only a first distance 50 is measured, and the further image(s) 61, 62 are captured without a simultaneous distance measurement.

During the capturing of further images, a computing unit of the device determines relative poses of the images 60-62 (step 140). After the end of the capturing, the computing unit calculates based on the images 60-62 and on the relative poses an unscaled 3D geometry of the target object (step 150).

When the calculation 150 of the unscaled 3D geometry of the target object is finished, one or more of the saved distances 50-52 are retrieved from the data storage. As described further above, the positions of the points on the target object to which the distances have been measured are identified in other images in order to calculate a scale 160. This scale is then added to the formerly unscaled 3D geometry (step 170) so that a scaled spatial model of the target object results 180.

Figure 8:
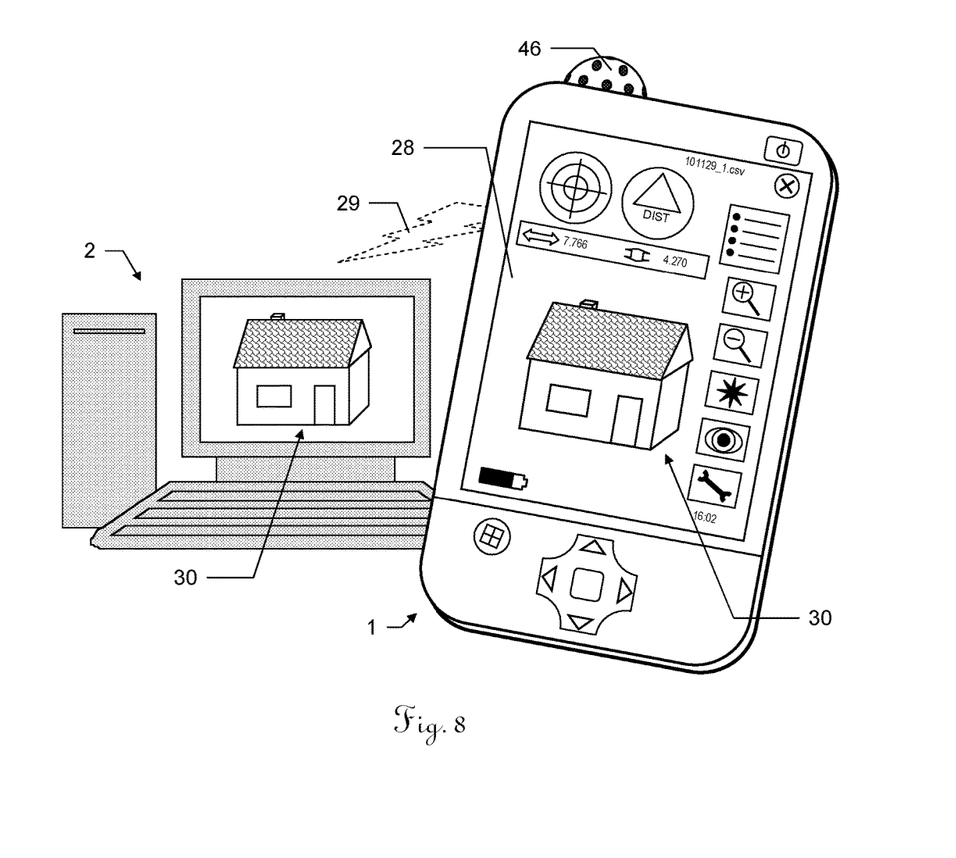
FIG. 8 shows an example embodiment of a handheld distance measuring device according to the invention displaying a spatial model of the target object.

FIG. 8 shows a spatial model 30 of the target object of FIGS. 6a and 6b, displayed on a touchscreen 28 of an example embodiment of a hand-held distance measuring device 1 according to the invention. Said device 1 has a hemispherical image acquisition unit 46 as described in FIGS. 5a-c, and also means for transmitting spatial model data to an external device such as a personal computer 2 by means of a wireless connection 29, e.g. a Bluetooth or Wi-Fi connection.

The spatial model 30 comprises a scaled geometry, e.g. a 3D point cloud or mesh, and texture from the images. Alternatively, only the geometry without special texture can be displayed. Zooming in and out is possible in both cases, as is rotating the view.

It is possible to perform further measurements in the spatial model 30, for example distance or area calculations. For instance, by marking two points in the spatial model 30 on the touchscreen 28 of the distance measuring device 1 or using a mouse of the computer 2, a user can have the distance between the two points calculated and displayed. Optionally, data from inertial sensors or a compass may be used to determine slopes or orientations of surfaces in the 3D model.

It is obvious that these illustrated figures only schematically illustrate possible example embodiments. The various approaches can also be combined with one another and with methods and devices of the prior art.

What is claimed is:

1. A method for creating a spatial model of a target object with a hand-held distance measuring device, the device comprising a laser distance meter, a camera, a computing unit and a data storage device, the method comprising:
    measuring with the laser distance meter one or more distances to a planar or substantially planar surface of the target object,
    storing the one or more measured distances in the data storage device,
    capturing with the camera a plurality of images of the surface of the target object from different positions, wherein each of the measured distances is associated with one of the captured images,
    determining with the computing unit relative camera poses for the plurality of images, and
    calculating with the computing unit based on the plurality of images and on the determined relative camera poses a three-dimensional geometry of the target object, wherein,
        after the three-dimensional geometry has been calculated, the method further comprises:
        retrieving at least one of the measured distances from the data storage device, and
        adding a scale to the three-dimensional geometry to obtain the spatial model of the target object, wherein the scale is calculated based on the at least one retrieved distance and calculating the scale comprises:
            identifying a measurement point to which a distance is measured by the laser distance meter in one or more images that are not associated with the respective distance; and
            determining three-dimensional coordinates of the measurement point by means of forward intersection.

2. The method according to claim 1, wherein:
    calculating the three-dimensional geometry is performed by means of a Structure-from-Motion algorithm or a Simultaneous Localization and Mapping algorithm of the computing unit.

3. The method according to claim 1, wherein:
the spatial model comprises image data of the images and a multitude of spatial coordinates obtained by means of feature extraction in the images and using the three-dimensional geometry.

4. The method according to claim 1, wherein:
the three-dimensional geometry is calculated without a scale.

5. The method according to claim 1, wherein:
the three-dimensional geometry is calculated with a preliminary scale, and adding the scale comprises replacing the preliminary scale with the scale that is based on the at least one retrieved distance.

6. The method according to claim 1, wherein:
a first distance of the plurality of distances to the target object is measured simultaneously or basically simultaneously with the capturing of a first image of the plurality of images, wherein the first distance is associated with the first image.

7. The method according to claim 1,
wherein a user of the device is guided by the device to perform the steps of measuring distances to the surface and capturing images of the surface.

8. The method according to claim 1, wherein:
for calculating the scale, a point of the three-dimensional geometry is identified that has the smallest orthogonal distance to the laser distance measurement emission direction.

9. The method according to claim 8, wherein a laser spot generated by the laser distance meter in the course of the at least one distance measurement is identified in an image.

10. The method according to claim 1, wherein:
for calculating the scale, the laser distance measurement emission direction is intersected with a plane described by at least three points of the three-dimensional geometry, or with an object surface model, particularly obtained by meshing of a sparse or dense point cloud.

11. The method according to claim 10, wherein the plane is obtained by meshing of a sparse or dense point cloud.

12. The method according to claim 1, wherein:
for calculating the scale, a dense matching algorithm is used to obtain a pixel location of a laser distance measurement in at least one image not associated with the same laser distance measurement,
wherein a rough estimate of the scale is obtained by identifying a closest point or by using an intersection of an emission direction with the object surface model, and the rough estimate of the scale is refined using the dense matching algorithm.

13. The method according to claim 1, wherein capturing the plurality of images comprises
recording an image stream or a video stream.

14. The method according to claim 6, wherein every distance of the plurality of distances to the target object is measured simultaneously or basically simultaneously with the capturing of an image of the plurality of images.

15. The method according to claim 1, wherein:
for calculating the scale, a Semi-Global Matching algorithm is used to obtain a pixel location of a laser distance measurement in at least one image not associated with the same laser distance measurement,
wherein a rough estimate of the scale is obtained by identifying the closest point or by using the intersection of the emission direction with the object surface model, and the rough estimate of the scale is refined using the Semi-Global Matching algorithm.

16. A hand-held distance measuring device for creating a spatial model of a target object, the device comprising a laser distance meter, a camera, a computing unit, a display device and a data storage device, wherein:
the display device is configured to display the spatial model,
the laser distance meter is adapted to measure distances to a planar or substantially planar surface of the target object into a direction defined by an emission axis,
the camera is configured to capture images of the surface of the target object, wherein each measured distance is associated with a captured image,
the data storage device is configured to store the measured distances, and
the computing unit is configured to determine relative poses of the images and to calculate, based on the images and on the determined relative poses a three-dimensional geometry of the target object, wherein:
the computing unit is configured, after having calculated the three-dimensional geometry:
to retrieve at least one of the measured distances from the data storage device, and
to add a scale to the three-dimensional geometry to obtain the spatial model of the target object,
wherein the scale is calculated based on the at least one retrieved distance and wherein calculating the scale comprises:
identifying a measurement point to which a distance is measured by the laser distance meter in one or more images that are not associated with the respective distance; and
determining three-dimensional coordinates of the measurement point by means of forward intersection.

17. The hand-held distance measuring device according to claim 16, wherein:
the camera is a wide-angle camera having a camera angle of at least 80°.

18. The hand-held distance measuring device according to claim 16, further comprising a plurality of cameras, wherein the images are wide-angle images assembled from individual images of the plurality of cameras, wherein the angle range acquired by each of the images comprises at least 80°.

19. The hand-held distance measuring device according to claim 18, wherein the angle range acquired by each of the images comprises at least 120°.

20. The hand-held distance measuring device according to claim 16, comprising:
a plurality of laser distance meters for simultaneously measuring a plurality of distances to different points of the target object.

21. The hand-held distance measuring device according to claim 16, wherein:
an inertial and/or location sensor comprising an inertial measuring unit, a gyroscope, an inclination sensor, a global navigation satellite system (GNSS) sensor and/or a compass, for providing inertial and/or location data of the distance measuring device, wherein the computing unit is configured to determine the relative poses based also on the inertial and/or location data.

22. Hand-held distance measuring device according to claim 16, wherein:
the display device is configured for displaying instructions to position the device in a certain pose to a user.

23. A non-transitory computer program product having program code which is stored on a machine-readable carrier for executing the following:

measuring with the laser distance meter one or more distances to a planar or substantially planar surface of the target object from different positions, storing the measured distances in the data storage device, capturing with the camera a plurality of images of the surface of the target object, wherein each of the measured distances is associated with one of the captured images, determining relative camera poses for the plurality of images, and calculating based on the plurality of images and on the determined relative camera poses a three-dimensional geometry of the target object, retrieving at least one of the measured distances from the data storage device, and adding a scale to the three-dimensional geometry to obtain the spatial model of the target object, wherein the scale is calculated based on the at least one retrieved distance and calculating the scale comprises:
 identifying a measurement point to which a distance is measured by the laser distance meter in one or more images that are not associated with the respective distance; and
 determining three-dimensional coordinates of the measurement point by means of forward intersection.

* * * * *